Aug. 3, 1937. A. C. HOUGLAND 2,089,093
MACHINE FOR SOLIDIFYING MOLASSES AND LIKE PRODUCTS
Filed Feb. 11, 1935 2 Sheets-Sheet 1

Inventor
Albert C. Hougland
By
Attorneys

Aug. 3, 1937. A. C. HOUGLAND 2,089,093
MACHINE FOR SOLIDIFYING MOLASSES AND LIKE PRODUCTS
Filed Feb. 11, 1935 2 Sheets-Sheet 2
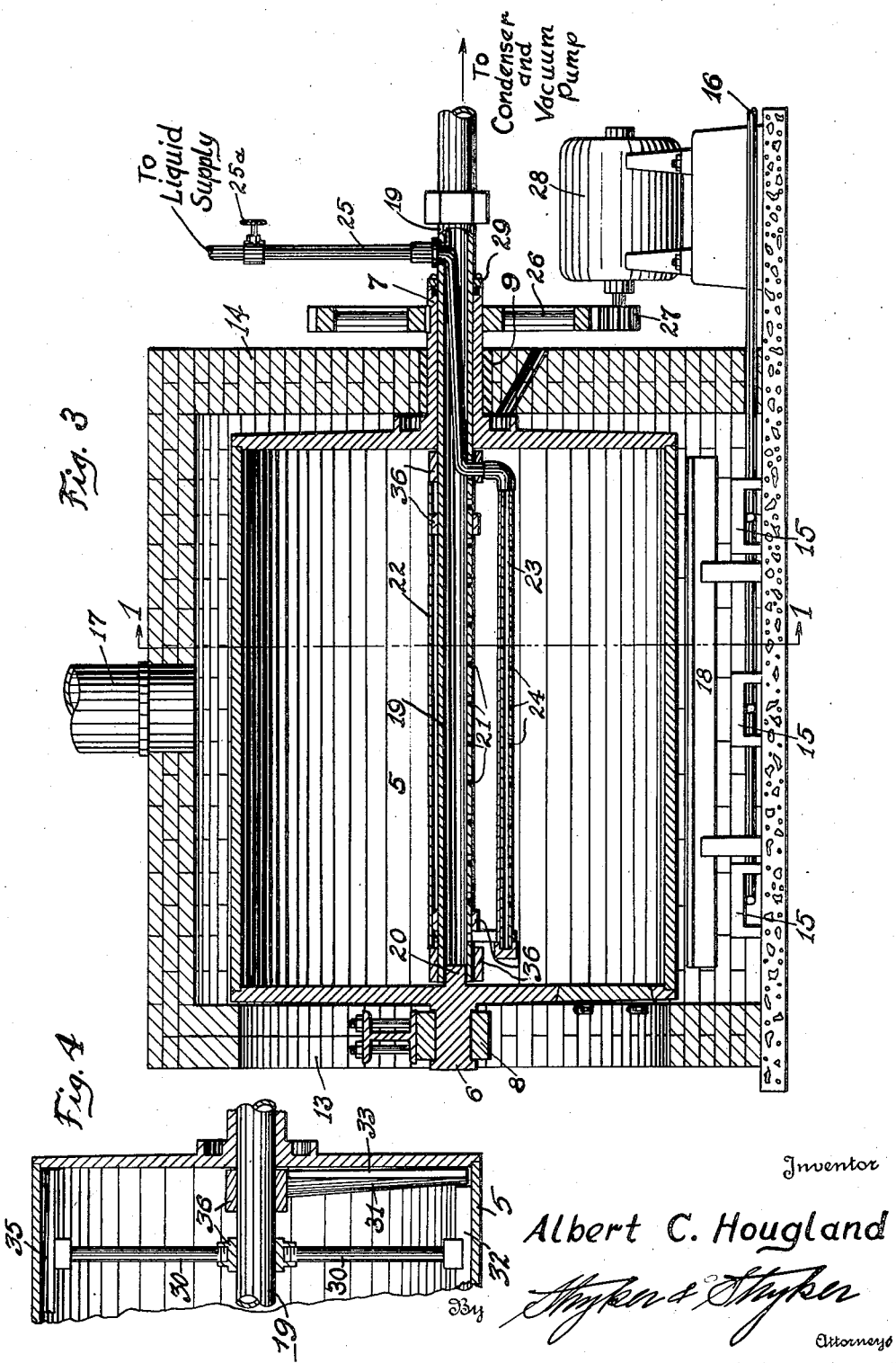
Inventor
Albert C. Hougland
Attorneys Patented Aug. 3, 1937

2,089,093

UNITED STATES PATENT OFFICE 2,089,093

MACHINE FOR SOLIDIFYING MOLASSES AND LIKE PRODUCTS

Albert C. Hougland, St. Paul, Minn.

Application February 11, 1935, Serial No. 6,041

2 Claims. (Cl. 159—12)

Molasses, the by-product of the manufacture of sugar, is known to have valuable properties as a feed for livestock, but is commonly handled in the liquid form which, when mixed with dry feeds, soon causes fermentation so that the mash must be prepared immediately before feeding. Liquid molasses is also hard to handle in that it is viscous and gummy. By the present invention I produce economically a solidified or substantially dry molasses which may be mixed with other feeds and is not subject to fermentation. My product has the further advantages of being relatively easy to handle and inexpensive to ship because of its greater concentration as compared to the liquid product.

The object of this invention is to provide novel mechanism particularly, although not exclusively, adapted for the concentration or solidification of molasses under partial vacuum.

A further object is to provide economical and practical apparatus of this kind adapted for large scale production of concentrated molasses and other products requiring heat treatment under greatly reduced pressure conditions.

The invention will be best understood by reference to the accompanying drawings in which;

Fig. 3 is a longitudinal, vertical section, and

Fig. 4 is a fragmentary horizontal section through the drum head, showing the end scrapers.

Figure 1:
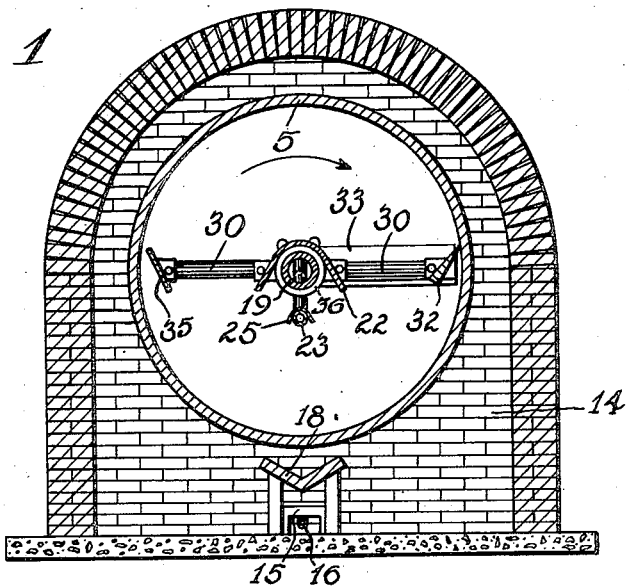
Figure 1 is a transverse section through my improved concentrating machine.
Figure 2:
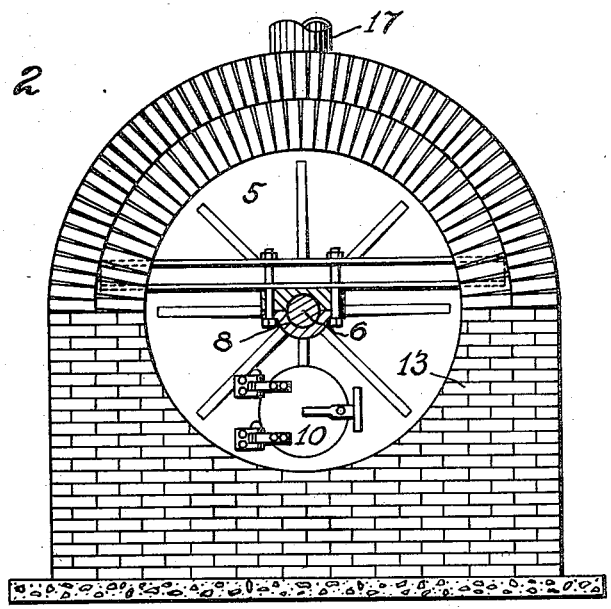
Fig. 2 is an end view of the same.

My concentrating apparatus has a large drum or cylindrical container 5 provided with axially positioned shafts 6 and 7 disposed horizontally in bearings 8 and 9. A door 10 at one end allows access to the interior of the container for withdrawal or removal of the concentrated product. The bearings 8 and 9 are supported in the end walls 13 and 14 respectively of a heating chamber, preferably formed from brick or like refractory material. This heating chamber has a series of burners 15 at the bottom adapted to be supplied with fuel through a pipe 16 and a suitable stack 17 communicates with the top of the chamber. A baffle 18 extends between the burners 15 and the container 5 to guard against overheating the lower periphery of the container.

The shaft 7 is hollow and a large stationary pipe 19 passes through said shaft and extends axially in the container 5 to a bearing stud 20 formed on the container concentrically with the shaft 6. At its outer extremity the pipe 19 communicates with suitable condensing apparatus and a vacuum pump adapted to maintain a high vacuum in the casing. Suitable condensers and vacuum pumps are common articles of commerce and are not illustrated in the drawings. At its lower periphery within the container 5 the pipe 19 is formed with a multiplicity of intake openings 21 and a hood 22 is placed over the pipe 19 to prevent the liquid contents of the casing from entering the openings 21. A liquid supply pipe 23 is suspended from the pipe 19 within the container 5 and has outlet openings 24 at suitable intervals to distribute the molasses or other product to be concentrated within the container 5. This pipe 23 is also provided with a hood 25 to guard against the clogging of the openings 24 by the concentrated liquid within the drum. A pipe 25 is arranged to supply the liquid to be concentrated to the pipe 23 under control of a valve 25a.

Means are provided for rotating the container 5, such means in the embodiment illustrated comprising a large gear 26 fixed on the shaft 7, a pinion 27 in mesh with the gear 26 and a motor 28 operatively connected to the pinion 27. It will be understood that the pipes 19 and 23 are stationary while the container 5 is rotated, a suitable packing gland 29 being provided at the outer end of the shaft 7 around the pipe 19.

As best shown in Figs. 1 and 4, a series of arms 30 and 31 project horizontally from the pipe 19 and have scrapers 32 and 33 rigidly mounted on their outer ends to engage the inner periphery and ends respectively of the container 5. The several arms 30 and 31 are rigidly secured to sleeves 36 fixed on the pipe 19 so that the scrapers 32 and 33 remain stationary while the casing is rotated. Mounted on a pair of the arms 30 and disposed diametrically opposite the scraper 32 is a distributing blade 35 adapted to spread the molasses or other liquid on the cylindrical surface of the container 5, said blade having its edge spaced slightly from the container to allow a thin coating of the liquid to pass to the scraper 32.

Operation

In operation, the exterior of the container 5 is heated by the products of combustion from the burners 15 while said container is rotated about its axis by power from the motor 28 transmitted through the pinion 27 and gear 26. During operation, a high vacuum, preferably equal to about twenty-seven inches of mercury is maintained within the container 5 by constantly withdrawing air and vapors through the pipe 19. Starting with the casing 5 empty and with the machine in operation, the valve 25a is opened to admit the molasses or other liquid through the pipe 23 which distributes the liquid upon the inner periphery of the casing. Accumulations of the liquid are spread on the drum by the blade 35. The water evaporates from the product principally on the upper periphery of the container and the vapor is drawn out through the openings 21 and pipe 19. The molasses is not allowed to remain in contact with the heated surfaces of the container 5 for a substantial period of time because of my arrangement of the scrapers 32 and 33 which continuously remove the concentrate from such surfaces and allow the more liquid portions to come in contact with the heated surfaces. As the operation continues the concentrated molasses collects in the bottom of the drum. The moisture is gradually drawn off until the product contains as low as 3% to 5% of moisture. When a suitable charge has thus been concentrated, the machine is stopped by shutting off the heat and power and relieving the vacuum. The door 10 is finally opened and the product withdrawn while in its heated condition in which it is still sufficiently liquid to permit pouring into molds where it solidifies upon cooling.

It will be evident that in the operation of my concentrating apparatus the evaporation of moisture takes place rapidly from a thin coating over a large area of heating surface against which the product is allowed to remain for a brief interval of time. This results in greatly improved operation because troublesome frothing is avoided. A concentrated product of high quality results because caramelization of the sugars and destruction of other valuable constituents is prevented by maintaining the low boiling temperatures throughout the operation corresponding to the low absolute pressures in the container 5.

Having described my invention, what I claim as new and desire to protect by Letters Patent is:

1. In a machine for desiccating molasses and other liquids in vacuo, a cylindrical container having its axis disposed horizontally, axial shafts integral with the ends respectively of said container, one of said shafts being hollow, journal bearings supporting said shafts, means for heating the periphery of said container, means for rotating said container about its axis, a fixed vacuum pipe extending axially within said container and through said hollow shaft, said pipe having a multiplicity of intake openings spaced apart longitudinally thereof within said container, a scraper engaging the inner periphery of said container, arms supporting said scraper on said vacuum pipe, means connected to said pipe for maintaining a high vacuum in said chamber and a hood projecting from said pipe and arranged to guard said intake openings against the entry of the liquid product into said pipe.

2. In a machine for desiccating molasses and other products in vacuo, a cylindrical container having its axis disposed horizontally, axial shafts integral with the ends of said container, one of said shafts being hollow, journal bearings supporting said shafts, means for heating the periphery of said container, means for rotating said container about its axis, a vacuum pipe extending axially within said container and through said hollow shaft, a scraper engaging the inner periphery of said container, arms supporting said scraper on said vacuum pipe, means connected to said pipe for maintaining a high vacuum in said chamber and a blade extending adjacent to the periphery of said container opposite said scraper and above the surface of the product therein to spread the product on the inner periphery of said container.

ALBERT C. HOUGLAND.